Figure 1:
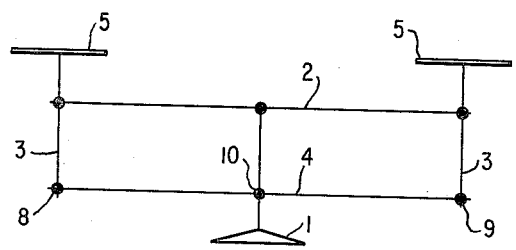

Sept. 24, 1963   H. A. HADLEY   3,104,728
CHECK LINK FOR WEIGHING SCALES
Filed July 25, 1961

INVENTOR
HARLAN A. HADLEY

BY Sherman and Sherman
ATTORNEY

United States Patent Office 3,104,728
Patented Sept. 24, 1963

3,104,728
CHECK LINK FOR WEIGHING SCALES
Harlan A. Hadley, P.O. Box 147, Burlington, Vt.
Filed July 25, 1961, Ser. No. 126,677
2 Claims. (Cl. 177—198)

This invention relates to weighing scales, and relates more particularly to an improved check link construction for weighing scales, especially for weighing scales of the equal-arm balance type.

In weighing scales of the type with which the present invention is concerned, an equal-arm lever is provided with knife edge fulcrum pivots which are supported on suitable bearings carried on a fulcrum stand. At each end of the lever is fixed a load pivot, on the knife edges of which are carried end-parallels or stirrups. The stirrups support at their upper ends the load and counterweight platforms, and the lower ends of the stirrups are connected by a check link. The primary function of the check link is to maintain the parallelogram relationship described by the scale elements, a parallelogram being formed by the longitudinal center line of the lever, the vertical center lines of the stirrups and the longitudinal center line of the check line, and two parallelograms being formed by splitting the foregoing parallelogram by a vertical line passing through the fulcrum pivot line and through the central pivot line of the check line. It is about this latter vertical line that the lever, the stirrups and the check link tilt during the operation of the weighing of the scale. By maintaining the parallelogram relationship of the scale elements, there are avoided errors which arise when the load and counterweight platforms are loaded unequally or when the loads are placed off-center thereon. However, one of the difficulties heretofore encountered in making a one-piece check link is the difficulty of accurately machining all the parts so that they could be assembled and still hold the friction to a minimum when the parallelogram was oscillated. There was also present in this type of link the additional friction encountered when a load was placed on the weight platforms and the upper lever deflecting under this load.

It is an object of my invention to provide a check link construction which will be free from the foregoing and other disadvantages, and which will be especially simple in construction and efficient in use.

Other objects of my invention, together with certain details of construction and combinations of parts, will be pointed out in the appended claims.

Figure 2:
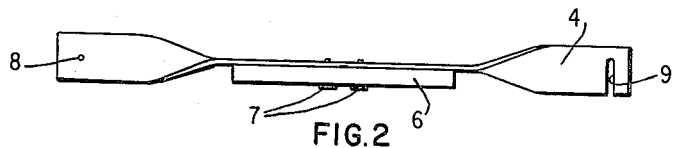
Figure 3:
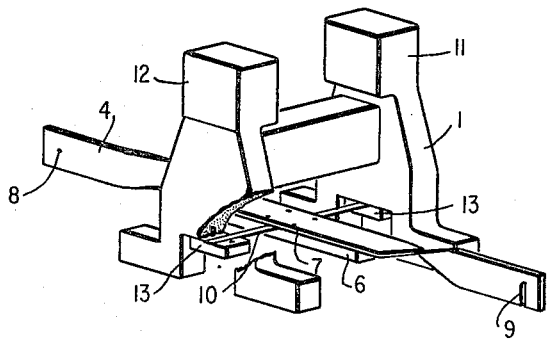

In the drawings wherein a preferred embodiment of my invention is shown,

FIG. 1 is a schematic view which illustrates a typical equal-arm balance with all the connecting parts, FIG. 2 is the side view of my novel check link, and FIG. 3 is a perspective view of the check link of the instant invention connected to the center fulcrum stand of a balance.

Like reference numerals indicate like parts throughout the several views of the drawing.

Referring now to the drawings for a detailed description of this invention, the reference numeral 1 designates a fulcrum stand which is common to all balances, and reference numeral 2 designates an equal-arm lever. On each extremity of the lever are provided integral right-angled extensions 3 which form part of a parallelogram and provides the connection between the upper equal-arm lever 2 and a lower check lever 4. Platforms 5 are suitably mounted on the extensions 3.

Referring to FIG. 2, the lower check lever 4 is manufactured from a thin section of steel each end of which is twisted 90° which permits an easy pin connection which is common to this well-known type of equal-arm balance. The flat portion of the check link 4 functions a clamp cooperating with a clamping member 6 and four clamping screws 7 as will be hereinafter pointed out. One end of this check link has a round hole 8 for receiving a pin connection. The invention also contemplates employing a square hole. The other end of this check link has a vertical slot 9 for receiving the other pin check.

The manner of connecting the check link of the instant invention to the funcrum stand 1 is clearly shown in FIGURE 3. The connecting means includes a thin steel band 10 stretched between the two vertical standards 11, 12 which form the fulcrum stand 1 and which is affixed to said standards by means of clamps 13. The band 10 is secured to the underside of the flat portion of the check link 4 by means of the clamping member 6 and the clamping screws 7.

This novel check link arrangement reduces the friction to a minimum at the connection point by use of the steel band 10. The round hole 8 for receiving the pin maintains a fixed parallelogram on one end. On the other end of this double parallelogram, another pin is permitted to float vertically in the slot 9 and thus maintains its own parallelogram regardless of the amount of deflection in the upper beam or lever 2.

The embodiment of my invention above described in connection with the showing in the drawings is to be regarded as illustrative only since my invention is susceptible of variations, modification and change within the spirit and scope of the appended claims.

What I claim as new and desired to secure by Letters Patent is:

1. In a weighing scale having a fulcrum stand, a lever pivotally mounted on said fulcrum stand and stirrups carried by said lever, a check link for maintaining said lever and said stirrups in predetermined relation, said check link comprising a bar extending longitudinally of said lever, means for connecting said check link to said fulcrum stand, means engaging one end of said check link to maintain said end in an essentially fixed position, the other end of said check link being provided with an essentially vertical slot, and a pin member received within said slot and enabling deflection of said other end.

2. A weighing scale in accordance with claim 1 wherein the check link is provided with a 90° twist at each end thereof, said twisted ends defining a horizontal intermediate portion on said bar.

References Cited in the file of this patent

UNITED STATES PATENTS

| 1,899,436 | Fletcher | Feb. 28, 1933 |
| 2,937,863 | Hadley | May 24, 1960 |

FOREIGN PATENTS

| 271,737 | Great Britain | June 2, 1927 |
| 649,183 | France | Dec. 19, 1928 |